United States Patent
Roberge

(10) Patent No.: US 10,961,865 B2
(45) Date of Patent: Mar. 30, 2021

(54) GAS TURBINE ENGINE STRUCTURE WITH INTEGRATED ACTUATION FEATURES

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 169 days.

(21) Appl. No.: 16/181,564

(22) Filed: Nov. 6, 2018

(65) Prior Publication Data

US 2020/0141264 A1    May 7, 2020

(51) Int. Cl.
*F01D 17/16* (2006.01)
*F04D 29/40* (2006.01)

(52) U.S. Cl.
CPC ........... *F01D 17/162* (2013.01); *F04D 29/40* (2013.01); *F05D 2220/32* (2013.01); *F05D 2240/12* (2013.01); *F05D 2250/90* (2013.01)

(58) Field of Classification Search
CPC .................................................. F01D 17/162
See application file for complete search history.

(56) References Cited

U.S. PATENT DOCUMENTS

| | | | | |
|---|---|---|---|---|
| 2,923,459 A | * | 2/1960 | Taylor | F01D 17/162 415/160 |
| 4,618,311 A | * | 10/1986 | Miura | F01D 17/162 415/134 |
| 5,067,323 A | * | 11/1991 | Bennett | F01D 17/162 60/39.27 |
| 5,261,227 A | * | 11/1993 | Giffin, III | F01D 17/162 60/226.1 |
| 9,518,687 B2 | | 12/2016 | Curlier et al. | |
| 9,574,578 B2 | | 2/2017 | Frick et al. | |
| 10,052,820 B2 | | 8/2018 | Kemmer et al. | |
| 10,174,763 B1 | * | 1/2019 | Orosa | F01D 17/162 |
| 2009/0165995 A1 | | 7/2009 | Bajusz et al. | |
| 2010/0236213 A1 | | 9/2010 | Schilling | |
| 2017/0051764 A1 | | 2/2017 | Rose et al. | |
| 2018/0169351 A1 | | 6/2018 | Hyde et al. | |
| 2019/0271338 A1 | * | 9/2019 | Thomsen | F15B 15/1457 |

FOREIGN PATENT DOCUMENTS

| GB | 2555578 A | 5/2018 |
|---|---|---|
| WO | 2017108793 A1 | 6/2017 |

OTHER PUBLICATIONS

European Search Report for European Application No. 1927525.7, dated Mar. 25, 2020, 7 pages.

* cited by examiner

*Primary Examiner* — Justin D Seabe
(74) *Attorney, Agent, or Firm* — Cantor Colburn LLP

(57) ABSTRACT

A casing assembly for a gas turbine engine includes a case having an outer case wall extending around a central axis, an inner case wall radially offset from the outer case wall, and one or more hydraulic fluid passages embedded in the case between the outer case wall and the inner case wall. A variable pitch stator vane system includes a plurality of stator vanes are located radially inboard of the inner case wall. Each stator vane is rotatable about a central vane axis. An actuation unit is operably connected to the plurality of stator vanes and driven by hydraulic fluid through the one or more hydraulic fluid passages to urge rotation of the plurality of stator vanes about their respective central vane axes.

14 Claims, 4 Drawing Sheets

GAS TURBINE ENGINE STRUCTURE WITH INTEGRATED ACTUATION FEATURES

BACKGROUND

Exemplary embodiments of the present disclosure pertain to the art of gas turbine engines. More particularly, the present disclosure relates to actuation systems to control movement of components of gas turbine engines.

Gas turbine engines utilize structural cases inside which alternating rows of rotating blades and vanes are located. Linear actuators are fixed to the exterior of the case and are connected to some of the vanes, typically via a synchronization ring and other components to rotate the vanes as part of a variable vane system. Such variable vane systems are utilized in, for example, fan, low pressure compressor and high pressure compressor sections of the gas turbine engine.

Such systems require considerable amounts of high pressure tubing to be secured to the case to convey hydraulic fluid to and from the hydraulic linear actuators. The tubing increasing the engine envelope, adds considerable weight to the gas turbine engine, and is exposed and may be easily damaged during manufacture and service of the gas turbine engine. In addition the hydraulic linear actuators contain a separate housing with resulting cost and weight.

BRIEF DESCRIPTION

In one embodiment, a casing assembly for a gas turbine engine includes a case having an outer case wall extending around a central axis, an inner case wall radially offset from the outer case wall, and one or more hydraulic fluid passages embedded in the case between the outer case wall and the inner case wall.

Additionally or alternatively, in this or other embodiments a hydraulic cylinder for a linear actuator is embedded between the outer case wall and the inner case wall. The one or more hydraulic fluid passages are in fluid communication with the hydraulic cylinder.

Additionally or alternatively, in this or other embodiments a hydraulic piston is located in the hydraulic cylinder. The hydraulic piston is movable in the hydraulic cylinder via hydraulic fluid flow into the hydraulic cylinder via the one or more hydraulic fluid passages.

Additionally or alternatively, in this or other embodiments the hydraulic cylinder has a closed end and an open end opposite the closed end. A linkage is operably connected to the hydraulic piston and extends through a coverplate installed over the open end.

Additionally or alternatively, in this or other embodiments the one or more hydraulic fluid passages are two hydraulic fluid passages and a first hydraulic fluid passage of the two hydraulic fluid passages extends into the hydraulic cylinder at a first axial side of the hydraulic piston, and a second hydraulic fluid passage of the two hydraulic fluid passages extends into the hydraulic cylinder at a second axial side of the hydraulic piston opposite the first side.

Additionally or alternatively, in this or other embodiments a synchronization ring is located at the case and is operably connected to the hydraulic piston. Movement of the hydraulic piston urges circumferential movement of the synchronization ring about the central axis.

Additionally or alternatively, in this or other embodiments a sleeve is located in the hydraulic cylinder between the hydraulic cylinder and the hydraulic piston.

Additionally or alternatively, in this or other embodiments the case is formed via additive manufacturing.

In another embodiment, a variable pitch stator vane system includes a case extending about a central axis. The case includes an outer case wall, an inner case wall radially offset from the outer case wall, and one or more hydraulic fluid passages embedded in the case between the outer case wall and the inner case wall. A plurality of stator vanes are located radially inboard of the inner case wall. Each stator vane is rotatable about a central vane axis. An actuation unit is operably connected to the plurality of stator vanes and driven by hydraulic fluid through the one or more hydraulic fluid passages to urge rotation of the plurality of stator vanes about their respective central vane axes.

Additionally or alternatively, in this or other embodiments the actuation unit includes a hydraulic cylinder for a linear actuator embedded between the outer case wall and the inner case wall. The one or more hydraulic fluid passages are in fluid communication with the hydraulic cylinder. A hydraulic piston is located in the hydraulic cylinder. The hydraulic piston is movable in the hydraulic cylinder via hydraulic fluid flow into the hydraulic cylinder via the one or more hydraulic fluid passages.

Additionally or alternatively, in this or other embodiments the hydraulic cylinder has a closed end and an open end opposite the closed end. A linkage is operably connected to the hydraulic piston and extends through a coverplate installed over the open end.

Additionally or alternatively, in this or other embodiments the one or more hydraulic fluid passages are two hydraulic fluid passages wherein a first hydraulic fluid passage of the two hydraulic fluid passages extends into the hydraulic cylinder at a first axial side of the hydraulic piston, and a second hydraulic fluid passage of the two hydraulic fluid passages extends into the hydraulic cylinder at a second axial side of the hydraulic piston opposite the first side.

Additionally or alternatively, in this or other embodiments the plurality of stator vanes are operably connected to the hydraulic piston via a synchronization ring disposed at the casing, wherein movement of the hydraulic piston urges circumferential movement of the synchronization ring about the central axis thus urging rotation of the plurality of stator vanes about their respective central vane axes.

Additionally or alternatively, in this or other embodiments a sleeve is located in the hydraulic cylinder between the hydraulic cylinder and the hydraulic piston.

Additionally or alternatively, in this or other embodiments the case is formed via additive manufacturing.

Additionally or alternatively, in this or other embodiments the plurality of stator vanes are one of a plurality of fan stator vanes, compressor stator vanes or turbine stator vanes.

In yet another embodiment, a gas turbine engine includes a turbine section, a combustor section configured to drive rotation of the turbine, and a compressor section including a variable pitch stator vane system. The variable pitch stator vane system includes a case extending about a central axis having an outer case wall, an inner case wall radially offset from the outer case wall, and one or more hydraulic fluid passages embedded in the case between the outer case wall and the inner case wall. A plurality of stator vanes are located radially inboard of the inner case wall, each stator vane rotatable about a central vane axis. An actuation unit is operably connected to the plurality of stator vanes and is driven by hydraulic fluid through the one or more hydraulic fluid passages to urge rotation of the plurality of stator vanes about their respective central vane axes.

Additionally or alternatively, in this or other embodiments the actuation unit includes a hydraulic cylinder for a linear actuator embedded between the outer case wall and the inner case wall. The one or more hydraulic fluid passages are in fluid communication with the hydraulic cylinder. A hydraulic piston is located in the hydraulic cylinder. The hydraulic piston is movable in the hydraulic cylinder via hydraulic fluid flow into the hydraulic cylinder via the one or more hydraulic fluid passages.

Additionally or alternatively, in this or other embodiments the plurality of stator vanes are operably connected to the hydraulic piston via a synchronization ring located at the casing. Movement of the hydraulic piston urges circumferential movement of the synchronization ring about the central axis thus urging rotation of the plurality of stator vanes about their respective central vane axes.

Additionally or alternatively, in this or other embodiments a sleeve is located in the hydraulic cylinder between the hydraulic cylinder and the hydraulic piston.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
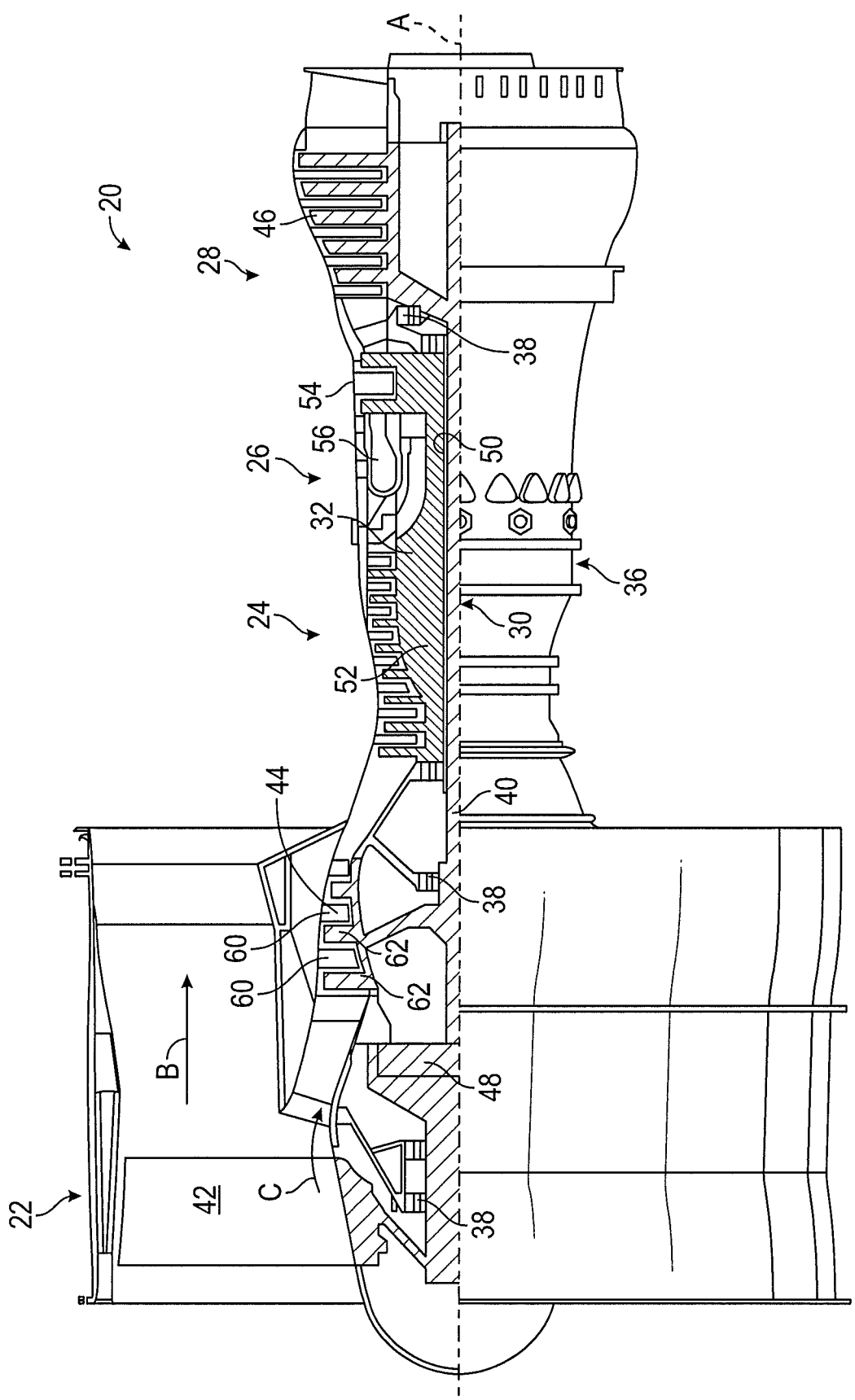
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

An embodiment of a low pressure compressor 44 includes one or more low compressor stators 60 arranged with one or more low compressor rotors 62. The low compressor rotors 62 are connected to the low speed spool 30 and rotate therewith.

Figure 2:
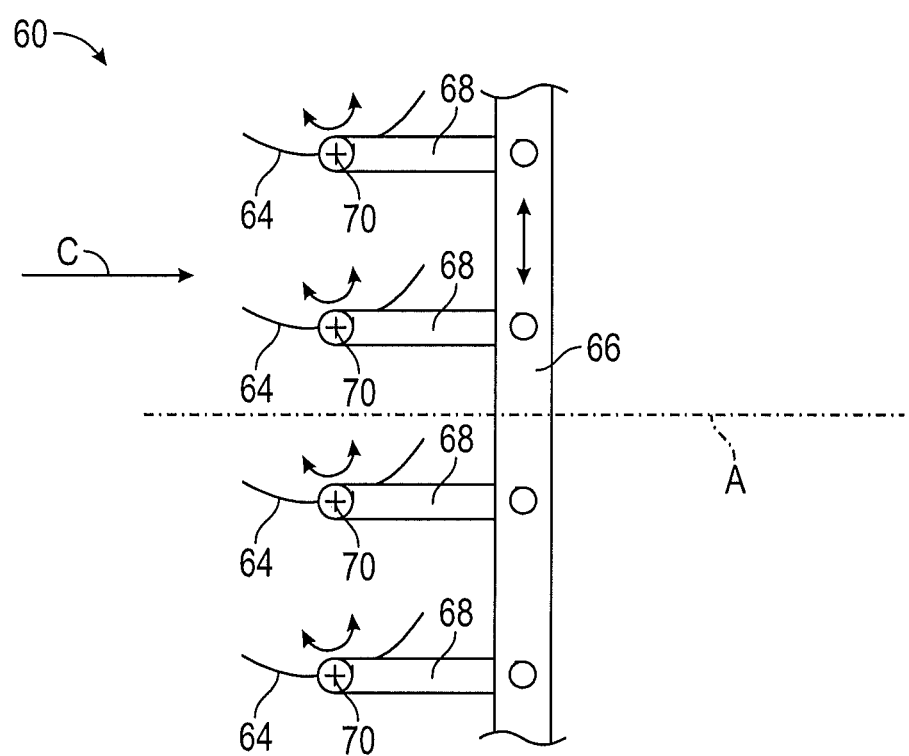
FIG. 2 is a schematic plan view of a variable pitch stator assembly of a gas turbine engine.

FIG. 2 illustrates a low compressor stator row 60, with a plurality of stator vanes 64. Each of the stator vanes 64 is connected to a synchronization ring 66 via a vane arm 68. The assembly is configured such that when the synchronization ring 66 is rotated circumferentially about the engine central longitudinal axis A, each of the stator vanes 64 rotates about a vane axis 70, thus changing a leading edge incidence angle and a trailing edge discharge angle of the flow by varying a pitch of the vanes 64 relative to the core flow C. While described herein in the context of a low pressure compressor 44 of a gas turbine engine 20, one skilled in the art will readily appreciate that the present disclosure may be similarly applied to synchronization ring and vane arrangements in other sections of the gas turbine engine 20, for example, the fan section 42, the low pressure turbine 46, the high pressure compressor 52 or the high pressure turbine 54.

Figure 3:
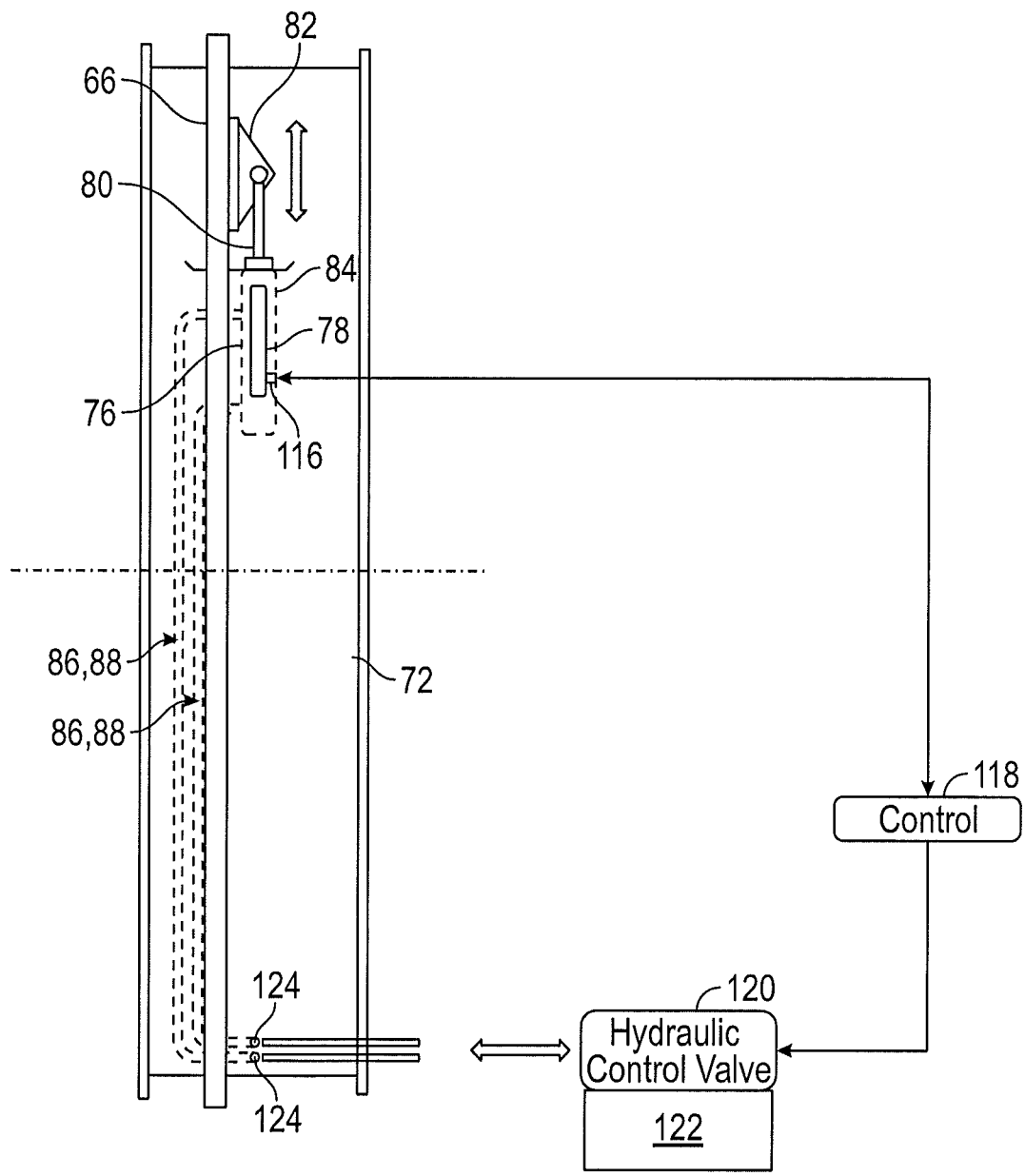
FIG. 3 is a schematic partial plan view of a linear actuator arrangement for a variable pitch stator assembly of a gas turbine engine.

Referring to FIG. 3, a linear actuator 76 is utilized to urge movement of the synchronization ring 66. The linear actuator 76 is a hydraulic actuator, and has a hydraulic piston 78 and linkage 80 connected to the synchronization ring 66 via an attachment clevis 82 or other feature of the synchronization ring 66. Linkage 80 between the hydraulic piston 78 and the attachment clevis 82 includes features (not shown) in linkage 80 that allow the linear actuator 76 to input an unchanging line of action while the sync ring 66 rotates about the engine axis A. As shown in FIG. 3, one or more elements are integrally formed in a low pressure compressor case 72. One such component is the static or stationary hydraulic cylinder 84 of the linear actuator 76 in which the dynamic or axially translating hydraulic position 78 is located. Further, pressurized hydraulic fluid passages 86 and 88 are formed integral to the low pressure compressor case 72. The hydraulic fluid passages 86, 88 are connected to the hydraulic cylinder 84 and urge movement of the hydraulic piston 78 via the controlled flow of pressurized hydraulic fluid into and out of the hydraulic cylinder 84. Movement of the hydraulic piston 78 in turn causes movement of the synchronization ring 66. While the concept described utilizes a hydraulic actuator 76 that is perpendicular to engine axis A and generally parallel to the sync ring 66, alternate embodiments are possible. These include actuator orientation parallel to engine axis A and interfacing with a sync ring 66 through a bell-crank or other mechanical mechanism.

Figure 4:
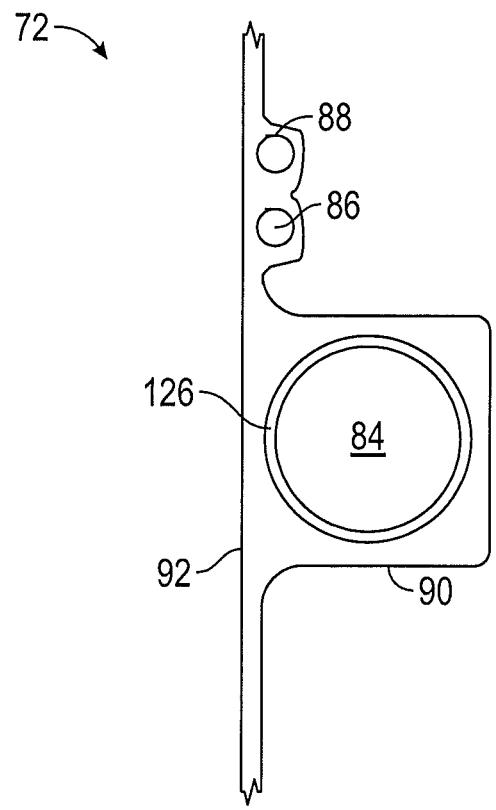
FIG. 4 is a schematic partial cross-sectional view of a case with integrated components.

Referring to the cross-sectional via of FIG. 4, as stated above the hydraulic cylinder 84 and the hydraulic fluid passages 86, 88 are integrally formed in the low pressure compressor case 72 and are located between an outer casing wall 90 and an inner casing wall 92. In some embodiments, the low pressure compressor case 72 is formed via additive manufacturing, but in other embodiments other manufacturing processes may be utilized to integrally form the hydraulic cylinder 84 and the hydraulic fluid passages 86, 88 in the low pressure compressor case 72. The low pressure compressor case 72 may be formed from, for example, titanium, aluminum, steel and nickel alloys. In some embodiments, a separate cylindrical sleeve 126, shown best in FIG. 4, is inserted into the hydraulic cylinder 84 to provide an increased durability and wear resistance sealing surface for the hydraulic piston 78 to interact with.

Figure 5:
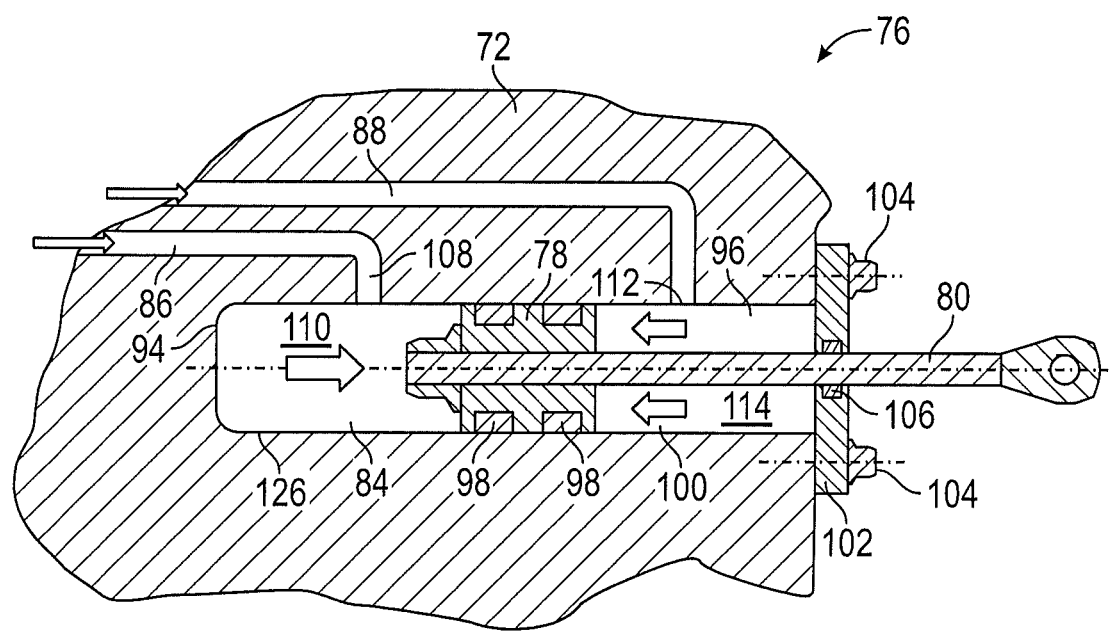
FIG. 5 is a schematic cross-sectional view of a linear actuator for a variable pitch stator assembly.

Shown in FIG. 5 is a cross-sectional view of the linear actuator 76. The hydraulic cylinder 84 is embedded in the low pressure compressor case 72 extending from a closed cylinder end 94 to an open cylinder end 96 opposite the closed cylinder end 94. The hydraulic piston 78 is located in the hydraulic cylinder 84 and may include one or more piston seals 98 to seal between the hydraulic piston 78 and a cylinder wall 100. The linkage 80 is connected to and extends from the hydraulic piston 78 through a coverplate 102 affixed over the open cylinder end 86 by, for example, one or more coverplate fasteners 104. In some embodiments, one or more coverplate seals 106 between the coverplate 102 and the linkage 80. The integrally formed hydraulic fluid passages 86, 88 extend through the cylinder wall 100 to supply hydraulic fluid pressure to the hydraulic cylinder 84. A first hydraulic fluid passage 86 extends through the cylinder wall 100 at a first passage opening 108 into a first cylinder portion 110 defined between hydraulic piston 78 and the closed cylinder end 94, while a second hydraulic fluid passage 88 extends through the cylinder wall 100 at a second passage opening 112 into a second cylinder portion 114 defined between the hydraulic piston 78 and the coverplate 102. Increasing the hydraulic fluid pressure in the first cylinder portion 110 moves the hydraulic piston 78 toward the coverplate 102 thus extending the linkage 80, while increasing the hydraulic fluid pressure in the second cylinder portion 114 moves the hydraulic piston 78 toward the closed cylinder end 94 thus retracting the linkage 80. In some embodiments, the hydraulic piston 78 are disposed in the cylinder sleeve 126 inserted into the hydraulic cylinder 84. Depending on the selection of materials for the low pressure compressor case 72 and hydraulic piston 78, material selection of sleeve 126 may provide enhanced wear properties. For example a case 72 fabricated using an aluminum alloy may desire a steel alloy sleeve 126. The sleeve 126 provides for ease of maintenance including removal and/or replacement of the hydraulic piston 78.

Referring again to FIG. 3, in some embodiments, a position sensor 116, such as a linear variable differential transformer (LVDT) or the like is positioned at the hydraulic cylinder 94 to detect a position of the hydraulic piston 78. The position sensor 116 is connected to an engine control system 118, which in some embodiments is a full authority digital engine control (FADEC) and provides the detected hydraulic piston 78 position to the engine control system 118.

The hydraulic fluid passages 86, 88 are connected to a hydraulic control valve 120 at a hydraulic fluid reservoir 122, via one or more hydraulic fittings 124 at the low pressure compressor case 72. The hydraulic control valve 120 is connected to the engine control system 118 and is configured to direct hydraulic fluid along the hydraulic fluid passages 86, 88 in response to commands from the engine control system 118. The position sensor 116 provides feedback to the engine control system 118 regarding position of the hydraulic piston 78.

The casing system disclosed herein having the hydraulic actuator cylinder 84 and/or hydraulic fluid passages 86, 88 embedded in the case has the technical effect of reducing component counts and thus providing a cost and weight reduction over traditional systems. Usage of external, exposed hydraulic fluid lines is reduced, thus reducing the risk of handling and maintenance damage to the thin-walled, high-pressure hydraulic fluid lines. Such a system is additional advantageous in configurations where multiple actuators are desired, or for small/expendable engines where scaling of components and associated limits make the combining of features and/or functions even more attractive. While in the above described embodiments, the linear actuator 76 with embedded hydraulic cylinder 84 and hydraulic fluid passages 86, 88 for use in variable vane actuation with a sync ring, one skilled in the art will readily appreciate that the present disclosure may be applied to other actuation systems, for example, control of a kinematic system for a variable exhaust nozzle.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing assembly for a gas turbine engine, comprising a case including:
   an outer case wall extending around a central axis;
   an inner case wall radially offset from the outer case wall;
   one or more hydraulic fluid passages embedded in the case between the outer case wall and the inner case wall;
   a hydraulic cylinder for a linear actuator embedded between the outer case wall and the inner case wall, the one or more hydraulic fluid passages in fluid communication with the hydraulic cylinder; and
   a hydraulic piston disposed in the hydraulic cylinder, the hydraulic piston movable in the hydraulic cylinder via hydraulic fluid flow into the hydraulic cylinder via the one or more hydraulic fluid passages;
   wherein the hydraulic cylinder has a closed end and an open end opposite the closed end, a linkage operably connected to the hydraulic piston extending through a coverplate installed over the open end.

2. The casing assembly of claim 1, wherein the one or more hydraulic fluid passages are two hydraulic fluid passages, wherein:
   a first hydraulic fluid passage of the two hydraulic fluid passages extends into the hydraulic cylinder at a first axial side of the hydraulic piston; and
   a second hydraulic fluid passage of the two hydraulic fluid passages extends into the hydraulic cylinder at a second axial side of the hydraulic piston opposite the first side.

3. The casing assembly of claim 1, further comprising a synchronization ring disposed at the case and operably connected to the hydraulic piston, wherein movement of the hydraulic piston urges circumferential movement of the synchronization ring about the central axis.

4. The casing assembly of claim 1, further comprising a sleeve disposed in the hydraulic cylinder between the hydraulic cylinder and the hydraulic piston.

5. The casing assembly of claim 1, wherein the case is formed via additive manufacturing.

6. A variable pitch stator vane system, comprising:
   a case extending about a central axis, including:
      an outer case wall;
      an inner case wall radially offset from the outer case wall; and
      one or more hydraulic fluid passages embedded in the case between the outer case wall and the inner case wall;
   a plurality of stator vanes disposed radially inboard of the inner case wall, each stator vane rotatable about a central vane axis; and
   an actuation unit operably connected to the plurality of stator vanes and driven by hydraulic fluid through the one or more hydraulic fluid passages to urge rotation of the plurality of stator vanes about their respective central vane axes;
   wherein the actuation unit includes:
   a hydraulic cylinder for a linear actuator embedded between the outer case wall and the inner case wall, the one or more hydraulic fluid passages in fluid communication with the hydraulic cylinder; and
   a hydraulic piston disposed in the hydraulic cylinder, the hydraulic piston movable in the hydraulic cylinder via hydraulic fluid flow into the hydraulic cylinder via the one or more hydraulic fluid passages; and
   wherein the hydraulic cylinder has a closed end and an open end opposite the closed end, a linkage operably connected to the hydraulic piston extending through a coverplate installed over the open end.

7. The variable pitch stator vane system of claim 6, wherein the one or more hydraulic fluid passages are two hydraulic fluid passages, wherein:
   a first hydraulic fluid passage of the two hydraulic fluid passages extends into the hydraulic cylinder at a first axial side of the hydraulic piston; and
   a second hydraulic fluid passage of the two hydraulic fluid passages extends into the hydraulic cylinder at a second axial side of the hydraulic piston opposite the first side.

8. The variable pitch stator vane system of claim 6, wherein the plurality of stator vanes are operably connected to the hydraulic piston via a synchronization ring disposed at the casing, wherein movement of the hydraulic piston urges circumferential movement of the synchronization ring about the central axis thus urging rotation of the plurality of stator vanes about their respective central vane axes.

9. The variable pitch stator vane system of claim 6, further comprising a sleeve disposed in the hydraulic cylinder between the hydraulic cylinder and the hydraulic piston.

10. The variable pitch stator vane system of claim 6, wherein the case is formed via additive manufacturing.

11. The variable pitch stator vane system of claim 6, wherein the plurality of stator vanes are one of a plurality of fan stator vanes, compressor stator vanes or turbine stator vanes.

12. A gas turbine engine, comprising:
a turbine section;
a combustor section configured to drive rotation of the turbine; and
a compressor section, including:
   a variable pitch stator vane system, including:
      a case extending about a central axis, having:
         an outer case wall;
         an inner case wall radially offset from the outer case wall; and
         one or more hydraulic fluid passages embedded in the case between the outer case wall and the inner case wall;
      a plurality of stator vanes disposed radially inboard of the inner case wall, each stator vane rotatable about a central vane axis; and
      an actuation unit operably connected to the plurality of stator vanes and driven by hydraulic fluid through the one or more hydraulic fluid passages to urge rotation of the plurality of stator vanes about their respective central vane axes;
   wherein the actuation unit includes:
      a hydraulic cylinder for a linear actuator embedded between the outer case wall and the inner case wall, the one or more hydraulic fluid passages in fluid communication with the hydraulic cylinder; and
      a hydraulic piston disposed in the hydraulic cylinder, the hydraulic piston movable in the hydraulic cylinder via hydraulic fluid flow into the hydraulic cylinder via the one or more hydraulic fluid passages; and
      wherein the hydraulic cylinder has a closed end and an open end opposite the closed end, a linkage operably connected to the hydraulic piston extending through a coverplate installed over the open end.

13. The gas turbine engine of claim 12, wherein the plurality of stator vanes are operably connected to the hydraulic piston via a synchronization ring disposed at the casing, wherein movement of the hydraulic piston urges circumferential movement of the synchronization ring about the central axis thus urging rotation of the plurality of stator vanes about their respective central vane axes.

14. The gas turbine engine of claim 12, further comprising a sleeve disposed in the hydraulic cylinder between the hydraulic cylinder and the hydraulic piston.

* * * * *